United States Patent [19]

Fiard et al.

[11] Patent Number: 5,128,206
[45] Date of Patent: Jul. 7, 1992

[54] COMPOSITE POLYESTER FILMS AS FINAL COATING SUPPORTS

[75] Inventors: Jean-François Fiard, Paris; Etienne Fleury; Louis Vovelle, both of Lyons, all of France

[73] Assignee: Rhone-Poulenc Chimie, Courbevoie, France

[21] Appl. No.: 601,811

[22] PCT Filed: May 2, 1990

[86] PCT No.: PCT/FR90/00146
§ 371 Date: Dec. 27, 1990
§ 102(e) Date: Dec. 27, 1990

[87] PCT Pub. No.: WO90/10666
PCT Pub. Date: Sep. 20, 1990

[30] Foreign Application Priority Data
Mar. 8, 1989 [FR] France .................... 89 03269

[51] Int. Cl.$^5$ ................. B32B 27/08; B32B 27/36
[52] U.S. Cl. ..................... 428/337; 427/412.5; 428/483; 428/694; 428/900; 428/910; 525/64; 525/445; 525/446
[58] Field of Search ............. 428/483, 694, 900, 910, 428/337; 525/64, 445, 446; 427/412.5

[56] References Cited

U.S. PATENT DOCUMENTS

| | | | |
|---|---|---|---|
| 4,605,591 | 8/1986 | Nose et al. | 428/332 |
| 4,880,700 | 11/1989 | Charmot et al. | 428/337 |
| 4,908,277 | 3/1990 | Tsunashima et al. | 428/480 |

FOREIGN PATENT DOCUMENTS 61-204240 9/1986 Japan .

OTHER PUBLICATIONS

Considered to the extent of English translation provided.

Primary Examiner—Paul J. Thibodeau
Assistant Examiner—D. S. Nakarani
Attorney, Agent, or Firm—Burns, Doane, Swecker & Mathis

[57] ABSTRACT

The invention relates to orientated composite polyester films carrying, on at least one face, a coating intended to improve the slip properties, consisting of a graft polymer comprising a backbone derived from a polyester containing sulphonyloxy groups and grafts of polymer units derived from at least one ethylenically unsaturated monomer and at least one ethylenically unsaturated organosiloxane.

The composite polyester films according to the invention are very particularly suitable for the production of magnetic tapes.

28 Claims, No Drawings

COMPOSITE POLYESTER FILMS AS FINAL COATING SUPPORTS

The present invention relates to composite polyester films having improved slip which are intended for use as support for varied final application coatings and in particular for magnetic coatings.

Because of their excellent mechanical and chemical properties, the polyester films are a material of choice as support for varied film-forming coatings leading to composite materials which find numerous applications: packaging, photographic coatings, films or sheets for graphic art, metallized films, and magnetic tapes for recording sound, images or other information. However, the polyester films lack slip, which causes difficulties in use and in particular in winding, this being a consequence of a high coefficient of friction of the films slipping on themselves or on fixed or moving smooth metallic surfaces, such as those present in film production equipment (rollers, cylinders) or conversion equipment or in application equipment, in particular equipment for the reproduction of recorded signals. The means most frequently used to resolve the problem posed by the lack of slip on the part of polyester films consists in conferring surface roughness to said films by incorporation of inert particles of metal salts or oxides which generate unevenness on the surface of the films. In certain cases, this solution is not always sufficient in itself to confer the desired slip to the polyester films and for some types of applications it proves detrimental to the properties of the final coating, in particular when magnetic coatings are concerned.

In fact, the irregularities in the surface of the support film are reflected by irregularities in the surface of the magnetic coating and even by a discontinuity in this coating, which are accompanied by a loss of information on recording and/or on reading the information. Moreover, the abrasion of this unevenness during repeated use of the magnetic films also contributes to their deterioration.

To mitigate these various drawbacks it has been proposed to provide the polyester films with coatings intended to improve their slip properties and consequently their machinability and their windability. In particular, slip coatings based on film-forming polymers which are very particularly suitable for polyester films of low roughness used as supports for magnetic layers have been described. Thus, in U.S. Pat. No. 4,233,352 it has been proposed to provide at least one of the faces of a polyester support film with a vermiculated coating intended to improve the slip properties of the film, consisting of a water-soluble polymer (polyvinyl alcohol, methylcellulose, hydroxyethylcellulose, carboxyethylcellulose or natural rubbers) and of a polysiloxane having a molecular weight of between 30,000 and 300,000, optionally containing functional groups (epoxy, amino or hydroxyl), and/or of a styrene-butadiene rubber. In European Patent Applications Nos. 74,750, 88,635 and 108,593 slip coatings have been described which are analogous to the above but also contain coupling agents intended to improve the bond between the surface of the polyester film and the coating. These coupling agents consist of silanes containing functional groups: on the one hand methoxy, ethoxy and silanol OH groups and on the other hand vinyl, epoxy, amino and mercaptan groups. These coatings are of limited industrial value because of their complex composition due essentially to the poor compatibility of the water-soluble polymers with the highly hydrophobic polyester film. The problem therefore arose of finding a coating which confers good slip properties to polyester films and which has a good compatibility with, and consequently a good adherence to, the polyester, without resorting to complex compositions. The present invention proposes to find a solution to this problem.

More specifically, the present invention relates to composite polyester films having improved slip, consisting of an orientated polyester film in which at least one of the faces carries a coating intended to confer upon it a good slip, characterized in that the said coating consists of at least one modified polymer consisting of a graft polyester comprising:

a) a backbone derived from a polyester which can be dissipated in water and contains a plurality of sulphonyloxy groups of general formula:

$$(-SO_3-)_nM \qquad (I)$$

in which:

n is equal to 1 or 2

M represents a hydrogen atom, an alkali metal or alkaline earth metal, an ammonium cation or a quaternary ammonium cation;

b) grafts consisting of copolymer units derived from at least one ethylenically unsaturated monomer and at least one ethylenically unsaturated organopolysiloxane soluble in the said ethylenically unsaturated monomer or monomers.

For the purposes of the present invention, polyesters soluble in water or polyesters forming stable dispersions in water are designated "polyesters which can be dissipated in water".

These polyesters, containing sulphonyloxy groups, which can be dissipated in water are known products, described in particular in French Patents Nos. 1,401,581 and 1,602,002 and European Patent Application No. 0,129,674; for the purposes of the present invention, it is possible to have recourse to the polyesters containing sulphonyloxy groups which are described in these patents. More specifically, the polyesters which can be dissipated in water are obtained by a polycondensation reaction of one or more dicarboxylic acids with at least one or more aliphatic diols and at least one difunctional compound containing at least one sulphonyloxy group; in the text which follows, for the convenience of the description, the expression "sulphonyloxy group" will designate both the hydroxysulphonyl groups and the alkali metal, alkaline earth metal or ammonium salts which are derived from them.

Amongst the dicarboxylic acids which can be used to prepare the polyesters which can be dissipated in water, the following may be mentioned by way of non-limiting examples: aromatic acids, such as terephthalic, isophthalic, phthalic, 1,4-naphthalenedicarboxylic and 4,4'-oxydibenzoic acids, bis(4-hydroxycarbonylphenyl)sulphone and 4,4'-dihydroxycarbonylbenzophenone; aliphatic acids containing 3 to 15 carbon atoms, such as adipic, suberic, sebacic, succinamic and dodecanedioic acids can be used on their own or in mixtures. Amongst the abovementioned acids, terephthalic and isophthalic acids are preferably used, on their own or in combination with the other acids mentioned. The mixtures of terephthalic acid with one or more other aromatic and/or aliphatic dicarboxylic acids, and in particular with isophthalic acid, are very particularly suitable for obtaining sulphonated polyesters which can be dissipated in water. In this case, the amount of terephthalic acid expressed in moles can vary between 20 and 99% of the total number of moles of non-sulphonated diacids, and preferably between 30 and 95%.

For the preparation of sulphonated polyesters which can be dissipated in water, the dicarboxylic acids can be replaced, during the polycondensation reaction, by their derivatives customarily used in this type of reaction: anhydrides, esters or acid chlorides. The esters, and in particular the methyl esters, are preferably used.

The following may be mentioned as examples of diols which can be used for the preparation of the sulphonated polyesters which can be dissipated in water: ethylene glycol; butane-1,2-diol; 2,2-dimethylpropane-1,3-diol; pentane-1,5-diol; hexane-1,6-diol; diethylene glycol; triethylene glycol; neopentyl glycol; cyclohexanedimethanol; tetraethylene glycol; and penta-, hexa- or deca-methylene glycol. Ethylene glycol and its oligomers are very particularly suitable for the preparation of the sulphonated polyesters. They can be used on their own or as a mixture with one another and/or with other diols. The mixtures of ethylene glycol and of its oligomers of formula $HO-(CH_2-CH_2-O-)_nH$, in which n is an integer between 2 and 10, are preferred.

The sulphonyloxy groups of formula $-SO_3M$ are introduced into the polyester via a difunctional compound, containing a sulphonyloxy group, which is capable of reacting with the diacids and/or the diols in the course of the polycondensation reaction. Examples of such monomers are cited in French Patent No. 1,602,002. Alkali metal salts of aromatic dicarboxylic acids containing sulphonyloxy groups, such as those of sulphoisophthalic, sulphophthalic and 4-hydroxysulphonyl-naphthalene-2,7-dicarboxylic acids, or their derivatives and, in particular, their esters are preferably used. The amount of difunctional compound containing a sulphonyloxy group which is present in the sulphonated polyester, expressed in moles for a total of 100 moles of difunctional compound of the same nature, is preferably between 2 moles and 30 moles. In general, amounts of sulphonated difunctional compound of between 4 moles and 20 moles for a total of 100 moles of difunctional compound of the same nature are very suitable. Thus, when an alkali metal salt of 5-hydroxysulphonylisophthalic acid is used, this compound can represent from 4 moles to 30 moles for a total of 100 moles of dicarboxylic acid units present in the polyester.

The polyesters which can be dissipated in water which have been described above are obtained by conventional processes, for example by reaction of the diol or diols with a mixture of the methyl esters of the various necessary acids, in the presence of conventional transesterification catalysts, followed by polycondensation of the diol esters thus obtained. The amounts of each of the reactants are calculated so that the ratio of the total number of alcoholic hydroxyl groups to the total number of carboxyl groups is preferably between 2 and 2.5.

The preferred polyesters which can be dissipated in water are those which have a number-average molecular mass of between 10,000 and 35,000, an acid number of less than 5 mg of potassium hydroxide per gram and a proportion of sulphur of between 0.8 and 2% by weight, and preferably between 1.2 and 1.8%.

The following may be mentioned amongst the ethylenically unsaturated monomers from which the grafts can be derived:

a) acrylic monomers of general formula:

(II)

in which:

R represents a hydrogen atom or a lower alkyl group, optionally substituted by a hydroxyl group;

Y represents a hydroxycarbonyl functional group; alkoxycarbonyl of formula $-COOR_1$, in which $R_1$ is a straight-chain or branched alkyl radical containing 1 to 20 carbon atoms (optionally substituted by a hydroxyl radical); nitrile; amide of formula $-CON(R_2,R_3)$, in which $R_2$ and $R_3$, which may be identical or different, represent a hydrogen atom or a straight-chain or branched alkyl radical containing 1 to 20 carbon atoms.

Lower alkyl radical denotes alkyl radicals containing 1 to 4 carbon atoms.

Specific examples of radicals $R_1$, $R_2$ and $R_3$ which may be mentioned are the methyl, ethyl, n-propyl, isopropyl, n-butyl, isobutyl, tert.-butyl, n-pentyl, n-hexyl, 2-ethylhexyl, decyl, dodecyl and octadecyl radicals. Examples of hydroxyalkyl radicals $R_1$ which may be mentioned are the hydroxymethyl, 2-hydroxyethyl, 3-hydroxypropyl and 4-hydroxybutyl radicals.

In the formula (II), R preferably represents a hydrogen atom or methyl or hydroxymethyl radicals.

Amongst the acrylic derivatives of formula (II) which can be used for the preparation of the modified polymers, the following may be mentioned as non-limiting examples acrylic acid, methacrylic acid, acrylonitrile, methacrylonitrile, acrylamide, methacrylamide, N-methylacrylamide and the methyl, ethyl, n-propyl, isopropyl, n-butyl, isobutyl, 2-ethylhexyl and stearyl acrylates and methacrylates. These monomers can be used on their own or as mixtures of two or more than two acrylic derivatives. Examples which may be mentioned of a combination of acrylic derivatives are the mixtures: methyl methacrylate/acrylic acid and/or methacrylic acid, methyl methacrylate/acrylic acid or methacrylic acid/ethyl acrylate; methyl methacrylate/ethyl acrylate/acrylamide or methacrylamide; acrylamide/methacrylamide; butyl acrylate/acrylic acid; butyl methacrylate/ethyl acrylate.

b) vinyl monomers, such as the vinyl or allyl esters of aliphatic or aromatic carboxylic acids: vinyl acetate, vinyl propionate, and vinyl butyrate, stearate or benzoate; the vinyl-aromatic compounds: styrene and vinyltoluene; the ethylenic halides: vinyl chloride, vinylidene chloride and vinylidene fluoride; ethylenic carboxylic acids: itaconic and maleic acids; ethylenic sulphonic acids: vinylsulphonic, allylsulphonic, methallylsulphonic and styrenesulphonic acids. Preferably, modified polymers are used in which the grafts result from acrylic monomers of formula (II) with which a minor amount of one or more non-acrylic monomers, such as those mentioned above, can be combined. In this case, the amount of non-acrylic ethylenic monomer is calculated so that the number of recurring units of this non-acrylic monomer in the copolymer obtained, expressed in moles per 100 moles of acrylic monomer, is preferably less than or equal to 20% and still more preferentially 10%. Amounts of ethylenic units representing 0.1 to 5 mole % are very suitable.

Without going beyond the scope of the present invention, it is possible to combine with these monomers one or more monomers capable of causing crosslinking of the acrylic part. To this end, polyethylenic monomers capable of crosslinking under the action of compounds generating free radicals in the course of the polymerization, or monomers causing crosslinking of the acrylic part by heating, for example during the process for obtaining the coated film or during a subsequent heat treatment of the coated film, can be used. Examples of polyethylenic monomers which may be mentioned are diallyl phthalate, divinylbenzene, and the diacrylates or dimethacrylates of diols, such as ethylene glycol dimethacrylate. Hydroxyalkyl(meth)acrylamides, such as N-methylolacrylamide and N-methylolmethacrylamide, are suitable as crosslinking agents under the action of heat.

The amount of crosslinking monomer, expressed as above, is preferably less than 5 moles per 100 moles of non-crosslinking acrylic monomer. In general it is between 0.1 and 3 mole %.

The ethylenically unsaturated organopolysiloxanes from which the copolymer units making up the grafts are derived can be represented by the following average formula:

R"R'RSiO (SiRR'"O)$_m$ (SiRR'"'O)$_n$ SiR'R" in which formula the symbols R are identical or different and represent a $C_1$-$C_4$-alkyl radical, phenyl or 3,3,3-trifluoropropyl;

the symbols R' are identical or different and represent R or a vinyl radical;

the symbols R" are identical or different and represent R or a radical OH;

the symbols R'" are identical or different and represent R, a vinyl radical or a —r—X unit in which r represents a divalent organic radical and X represents an ethylenically unsaturated group;

the symbols R"" are identical or different and represent R'" or a —r'—X' unit in which r' represents a divalent organic radical and X' represents a functional group which is not ethylenically unsaturated;

at least 60% of the radicals represented by R, R' and R" are methyl radicals; and the symbols m and n can separately be zero, R' and/or R"" representing a vinyl radical if m is zero, and have a value sufficient to ensure a viscosity of the polymer of the order of 20 mPas to 10,000,000 mPas at 25° C., preferably of the order of 50 to 7,000,000 mPas.

The following units may be mentioned as examples of diorganosiloxy units in which R'" and R"" represent R or a vinyl radical:

$(CH_3)_2SiO$; $CH_3(CH_2=CH)SiO$; $CH_3(C_2H_5)SiO$; $CH_3(C_6H_5)SiO$;

$(C_6H_5)_2SiO$; $CF_3CH_2CH_2(CH_3)SiO$.

Amongst the blocking triorganosiloxy units, those of the following formula may be mentioned:

$(CH_3)_3SiO_{0.5}$; $(CH_3)_2CH_2=CHSiO_{0.5}$; $(CH_3)_2C_6H_5SiO_{0.5}$;
$CH_3(C_6H_5)_2SiO_{0.5}$; $CH_3(CH_2=CH)C_6H_5SiO_{0.5}$;
$CH_2=CH(C_6H_5)SiO_{0.5}$; $(C_6H_5)_3SiO_{0.5}$.

Amongst the divalent organic radicals r and r' which can form part of the structure of the symbols R'" and R"", the following may be mentioned: straight-chain or branched $C_1$-$C_{18}$-alkylene radicals, optionally extended by 1 to 5 ethylene-amine divalent groups, by 1 to 50 $C_1$-$C_3$-alkylene oxide groups or by a group $$-O-CH_2-CH(OH)-CH_2-;$$

the polyoxyalkylene radicals containing 1 to 50 $C_1$-$C_3$-oxyalkylene chain members.

The following may be mentioned as examples of divalent radicals:

$-CH_2-$; $(CH_2)_2$; $(CH_2)_3$; $-CH_2-CH(CH_3)-CH_2-$;

$(CH_2)_{10}$; $(CH_2)_{12}$; $(CH_2)_3NH-CH_2-CH_2-$;

$(CH_2)_3OCH_2-$; $(CH_2)_3(OCH_2-CH_2)_{20}$;

$(CH_2)_3[O-CH_2-CH(CH_3)]_{15}$;

$(CH_2)_3OCH_2-CH(OH)-CH_2-$.

Amongst the ethylenically unsaturated groups X, the acrylyloxy and methacrylyloxy radicals may be mentioned in particular.

Amongst the functional groups X, the epoxy, hydroxyl, carboxyl, aldehyde, ester, acetoester and amino groups may be mentioned.

Amongst the preferred ethylenically unsaturated organopolysiloxanes, those containing acrylate or methacrylate functions may be mentioned, such as those described in the European Patent Application published under No. 281,718 and the U.S. Pat. Nos. 4,293,678; 4,139,548; 4,558,082; 4,663,185; 4,640,967.

The respective amounts of backbone and grafts going into the composition of the modified polymers correspond to:

2 to 60% by weight, preferably 10 to 50% by weight, relative to the modified polymer, of sulphonated polyester which can be dissipated in water;

0.05 to 30% by weight, preferably 5 to 25% by weight, relative to the modified polymer, of ethylenically unsaturated organopolysiloxane;

and, making up to 100%, units derived from ethylenically unsaturated monomer(s).

The relative amounts of the various units of the backbone and the grafts are a function of the desired properties of the said modified polymer: glass transition temperature, hardness, hydrophilic character, for example.

If products dispersible in water at an alkaline pH are desired, it will be preferable to have units derived from a vinyl monomer composition containing more than 5% of its weight, and generally of the order of 7 to 11% of its weight, of ethylenically unsaturated carboxylic acid and an amount of organopolysiloxane units of less than 30% of the total weight of the modified polymer.

The modified polymers can be prepared by:

preemulsion, in water, of a solution of organopolysiloxane in the vinyl monomer or monomers followed by addition of the emulsion obtained to a solution or to an aqueous dispersion of sulphonated polyester and polymerization in the presence of a water-soluble or water-dispersible initiator.

The amounts of reactants used correspond to:

2 to 60% by weight, preferably 10 to 50% by weight, relative to the total weight of monomers and polymers used, of sulphonated polyester.

0.05 to 30% by weight, preferably 0.5 to 10% by weight, relative to the total weight of monomers and polymers used, of ethylenically unsaturated organopolysiloxane making up to 100% with ethylenically unsaturated monomer or monomers 0.01 to 4%, preferably 0.05 to 2% by weight, relative to the total weight of monomers and polymers used, of water-soluble or water-dispersible initiator.

The step for preemulsion, in water, of the solution of organopolysiloxane in the vinyl monomer or monomers can be carried out using a weight ratio of vinyl monomer or monomers+organopolysiloxane/water of the order of 1/5 to 5/1, generally of the order of ⅓ to 3/1.

The emulsifying agents which can be used are conventional anionic agents represented, in particular, by the salts of fatty acids, the alkylsulphates, the alkylsulphonates, the alkylarylsulphonates, the sulphosuccinates, the alkylphosphates of alkaline metals, the salts of abietic acid, which may be hydrogenated, non-ionic agents, such as the polyethoxylated fatty alcohols, the polyethoxylated alkylphenols, the sulphated polyethoxylated alkylphenols and the polyethoxylated fatty acids.

They can be used in an amount of 0.1 to 3% by weight relative to the total weight of vinyl monomer or monomers, organopolysiloxane and sulphonated polyester (that is to say of vinyl monomer or monomers and polymers).

One variant of the preemulsion step consists in carrying out this step in the presence of an initiator soluble in organic compounds. Examples which may be mentioned are the organic peroxides, such as lauroyl peroxide, benzoyl peroxide and tert.-butyl peroxide; and the azonitriles, such as azo-bis-isobutyronitrile.

Another variant for carrying out the preemulsion step consists in using a fraction of the water-dispersible sulphonated polyester in this step, for example up to 50% by weight of the total weight of sulphonated polyester.

The preemulsion step is beneficially carried out by homogenization.

The polymerization step after addition of the emulsion to an aqueous solution or dispersion of sulphonated polyester is carried out in the presence of a water-soluble or water-dispersible initiator, such as, for example, hydroperoxides, such as hydrogen peroxide, cumene hydroperoxide, tert.-butyl hydroperoxide or diisopropylbenzene hydroperoxide, and persulphates, such as sodium persulphate, potassium persulphate or ammonium persulphate.

If appropriate, these initiators are combined with a reducing agent, such as sodium bisulphite or sodium formaldehyde sulphoxylate, polyethyleneamines, sugars: dextrose or sucrose, or metal salts. The amounts of reducing agent used vary from 0 to 3% by weight relative to the weight of the monomer(s)+polymers composition.

If appropriate, chain-limiting agents can be present in proportions ranging from 0 to 3% by weight relative to the monomer+polymers composition. They are generally chosen from the mercaptans, such as N-dodecyl mercaptan or tert.-dodecyl mercaptan; cyclohexene; the halogenated hydrocarbons, such as chloroform, bromoform, carbon tetrachloride or carbon tetrabromide; and the dimers of α-methylstyrene.

If necessary, a supplementary amount of emulsifying agents can be used.

The polymerization operation is carried out at a temperature which is a function of the decomposition temperature of the initiator; this operation generally takes place at a temperature of the order of 60° to 80° C. and preferably of the order of 75° C.

If desired, the latex obtained, which generally contains of the order of 10 to 40% by weight of modified polymer, can be pulverized to be stored and transported more easily.

The concentration of polyester which can be dissipated and of the monomer compound or compounds polymerizable in the aqueous phase for polymerization is not critical and can vary within wide limits. This concentration is chosen as a function of the proportion of solid materials desired for the final emulsion and of the degree of polymerization of the monomer compound or compounds under the polymerization conditions.

The aqueous product obtained after polymerization can be used directly for carrying out the process according to the invention. It can also be the subject of various treatments. Thus, at the end of the polymerization the removal of unconverted monomers can be carried out by the customary means. When one or more of the reaction constituents carries free acid groups, these groups can be neutralized by addition of an inorganic or organic base; an alkali metal base (sodium hydroxide or potassium hydroxide), a quaternary ammonium hydroxide or ammonia is preferably used. The free acid functions can be sulphonic acid functions of the polyester which can be dissipated and/or carboxylic acid functions of the unsaturated monomers. It is also possible to add adjuvants such as stabilizers or antistatic agents to the emulsion obtained. According to a variant, it is also possible to introduce external crosslinking agents into the emulsion obtained. Amongst the preferred crosslinking agents, the following may be mentioned: formophenolic resins and amine-formol resins such as the melamine/formol, urea/formol and triazine/formol condensation products. The amount of crosslinking agent is then generally between 0.1 and 15% by weight and preferably between 0 5 and 12% by weight relative to the total weight of the modified polyester.

The product resulting from the polymerization is in various forms, depending on the proportion and the nature of the reactants used and/or the polymerization conditions and/or the final treatment applied to the product obtained. Thus, the products resulting from the polymerization of a non-acid acrylic monomer with a considerable amount of a polymerizable acid ((meth)acrylic acids, crotonic acid), for example at least 5 mol % of the total polymerizable monomers, can be in the form of a true emulsion when the carboxylic acid groups are free or in the form of aqueous solutions of higher or lower viscosity when the carboxylic groups are neutralized by means of one of the bases cited previously and in particular by means of an alkali metal base. The viscosity of the dispersions or solutions of modified polymers is not critical and can be adjusted as desired depending on the needs by modification of their dry extract content.

The orientated films used as support for the modified polymer coating in the composite films according to the present invention consist of polyesters resulting from the polycondensation reaction of one or more aromatic dicarboxylic acids (or their derivatives), such as terephthalic, isophthalic and 2,6-naphthalenedicarboxylic acids, with one or more alkylene glycols (ethylene glycol; 1,3-propylene glycol; butane-1,4-diol). Minor amounts of aliphatic dicarboxylic acids (adipic acid for example) or of cyclohexanedicarboxylic acids or of diols such as the di- or tri-oxyalkylene glycols; the branched aliphatic diols (neopentyl glycol) or cyclohexane-1,4-dimethanol can be combined with the base diacids and diols. In general, these compounds do not represent more than 20 mol % of the latter. Polyesters containing at least 80 mol % of units derived from at least one aromatic dicarboxylic acid and ethylene glycol, and more preferentially at least 80 mol % of units of ethylene glycol terephthalate or naphthalenedicarboxylates, are preferably used. Examples which may be mentioned of polyesters which are preferentially used as supports are poly(ethylene glycol terephthalate); poly(butane-1,4-diol terephthalate); and poly(ethylene glycol 2,6-naphthalenedicarboxylate).

The orientated polyester support films are obtained in a conventional manner by extrusion of a sheet of amorphous polyester, cooling this sheet, drawing in one or two perpendicular directions, thermofixing and, as appropriate, treatments intended to produce equilibrated or "overstretched" films.

On one and/or the other face they can have a surface roughness generated by means of solid inorganic particles which are present in the polycondensate and which result either from the precipitation, in a manner known per se, of catalytic residues or from the incorporation in the polyester of known inorganic fillers, such as the metal oxides (alumina, silica, titanium dioxide), aluminosilicates (kaolin), metal salts ($BaSO_4$; $CaCO_3$) or their mixtures. The particle size of these fillers is that generally used in the field of polyester films and depends on the final use for which the film is intended.

The orientated polyester support films can themselves be single or composite films. Thus, it would not go beyond the scope of the present invention to use, as polyester support film, a composite polyester film obtained by coextrusion of two or three sheets of polymer which differ in respect of the nature of the constituent polyester and/or in respect of the presence or absence of fillers and/or in respect of the nature of the fillers and/or in respect of the particle size of the fillers and/or in respect of the filler content. For example, the support film can consist of a layer of a non-filled polyester and a layer of a filled polyester.

The thickness of the polyester support films used to obtain the composite polyester films according to the invention can be between 5 and 300 μm.

Although the coating of modified polymer according to the invention can be applied, as has been described above, to any type of polyester support films, it is advantageously used to confer good slip properties to polyester films having a low surface roughness. In particular, the coating of modified polymer is very particularly suitable for improving the slip of polyester films having a thickness of 5 to 30 μm and a roughness Ra or CLA (arithmetic mean variation) measured in accordance with DIN standard No. 4768 under the conditions defined below, less than 0.05 μm and preferably less than 0.01 μm. Polyester films of this type are sought after for the production of magnetic materials (films, tapes, disks) and in particular of magnetic recording materials of high information density. For this type of application it is suitable to have available a film which at the same time has as little surface roughness as possible, that is to say is virtually free from fillers, and as high as possible a slip power, of the film on itself or on fixed or moving metal surfaces. Recourse to modified polymer coatings according to the present invention enables these two contradictory demands to be reconciled.

A second subject of the present invention is therefore the use of the composite films according to the invention and in which the orientated polyester support film has a roughness Ra of less than or equal to 0.05 μm for the production of magnetic recording materials, in particular those of high information density in which the magnetic coating is formed by evaporation of metal oxides or alloys or by cathode coating (sputtering).

Finally, a third subject of the present invention is the magnetic recording materials of good slip power, in particular those of high information density in which the magnetic coating is formed by evaporation of metal oxides or alloys or by cathode coating (sputtering) and in which the support consists of the composite polyester films having a slip coating described above The deposition of the coating on the polyester film can be effected by the various techniques known to those skilled in the art. Thus, the aqueous emulsion or solution of modified polymer can be deposited by gravity from a slit caster or by passing the film into the emulsion or solution or by means of transfer rollers. The thickness of the layer is controlled by any appropriate means. The deposition of the coating can take place either before any drawing of the film (in-line coating) or after drawing and before or after thermofixing (back-coating). However, it is preferred to carry out the coating of the polyester film before drawing or between two drawings.

Before coating, the polyester film can be subjected to a surface treatment chosen from those customarily used and more particularly from the physical treatments. Thus, the face intended to receive the coating can be subjected to electric discharges (corona treatment) or to ionizing radiation. However, such treatments are not indispensable.

The amount of aqueous coating composition deposited on the film depends, on the one hand, on its dry extract content and, on the other hand, on the thickness desired for the final film coating, that is to say after drawing and thermofixing when the coating takes place in line. This amount also depends on the time of coating; of course, account must be taken of the variation in thickness of the coating before and after drawing when coating is carried out before drawing. The thickness of the final coating can vary within wide limits.

In general, the thicknesss of the modified polymer coating is greater than or equal to 0.05 μm and less than 0.7 μm. Preferably it is within a range of 0.1 to 0.5 μm.

After coating, the polyester film is heat-treated to remove the water contained in the coating and, where appropriate, to induce crosslinking of the polymer. In the case of coating in line, it is in general not necessary to carry out a heat treatment; drying and, where appropriate, crosslinking are effected in the course of drawing and thermofixing. However, it would not go outside the scope of the present invention to carry out a heat treatment sufficient to effect coalescence of the latex and drying prior to drawing and thermofixing in this case.

The modified polymer coating can be applied to only one of the faces or to both faces of the polyester support film. In the latter case, the coating located on the face intended to receive the final coating, and in particular the magnetic coating, contributes to improving the adherence to the support.

The production of magnetic recording films according to the invention is carried out by depositing a magnetic substance on one face of the composite polyester films, using known processes. Although it is possible to make use of coating by a magnetic coat consisting of a ferromagnetic substance such as the oxides of iron, nickel, cobalt or chromium or mixtures thereof dispersed in a polymer binder, the polyester films according to the invention are very particularly suitable for the production of high information density films by deposition of a thin magnetic coating by metal evaporation or ionic metallization techniques. Before deposition of the magnetic coating, the composite polyester film can be subjected to various treatments to improve its properties. Thus, it can undergo a corona treatment to improve its adhesion properties to the magnetic coating. With the same aim, it is also possible to apply to it a layer of an adhesion primer. To this end, numerous compositions which have been described in the literature and are well-known to those skilled in the art can be used. However, it proves advantageous to use aqueous solutions or dispersions of sulphonated polymers modified by acrylic monomers described in European Patent Application 0,260,203.

The examples which follow illustrate the invention and show how it can be implemented. In these examples the properties of the support films and/or of the composite films to which reference is made are as follows:

1) Roughnesses a) Arithmetic mean variation: roughness Ra (or CLA)

This characteristic, defined in DIN standard 4,768 was measured on a PERTHEN S6P apparatus in accordance with the method described in this standard, under the following conditions:
 value of the cut-off wavelength 0.08 mm
 probing length: 1 75 mm
 radius of curvature of the probe 5 μm
 bearing force of the probe : 50 mg.f The result retained is the mean of 30 measurements carried out on profiles 20 μm apart.

b) Maximum height of the surface peaks: MH

The maximum height of the surface peaks was determined by interferometry by the NOMARSKI method in white light A NACHET NS 400 microscope fitted with a NOMARSKI interferometer and with a lens having a magnification of 80 was used for this purpose.

c) Three-dimensional optical roughness SRa

The roughness SRa represents the arithmetic mean variation in the roughness of the surface relative to the mean plane expressed in μm (it is the extension of the roughness Ra at a surface).

The roughness SRa was determined using a SURF-CORDER ET-30 HK brand apparatus fitted with the SPA 11 treatment unit from KOSAKA Laboratories Ltd. and a HIPOSS brand optical type sensor, under the following conditions:
 cut-off wavelength: 0.08 μm
 magnification: ×20,000
 probing speed: 20 μm/s
 probing length 0.25 mm with a sampling step of 0.05 μm
 number of profiles: 150 with a step of 0.5 μm between profiles.
 surface area tested: 0.25 mm×0.075 mm
 amplification: 1
 hysteresis: 1

2) Coefficients of friction

Film/metal coefficients of static (μs) and dynamic (μd) friction

They were determined by the method known as "SHOE-SHINE" described in Japanese Patent Application J 63 28627 using an apparatus analogous to that described in the said application under the following conditions:

| | |
|---|---|
| diameter of the friction roller | 6 mm |
| band width | 1.27 cm |
| speed of movement | 0.9 m/min |
| strain | 50 g |
| time | 15 min |
| temperature | 25° C. |
| relative humidity | 35% |
| contact area | 1.27 × 0.7 cm² |

The frequency of shear stress is of the order of 1 Hz.

EXAMPLE

1) Preparation of a latex of graft sulphonated polyester a) Preemulsion

The following are mixed in a 1 l beaker:
100.8 g of methyl methacrylate
38.4 g of butyl acrylate
and 4.8 g of methacrylic acid.

The following are added, with stirring:
48 g of an unsaturated organopolysiloxane oil of average formula:

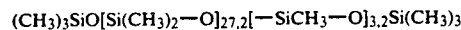

$(CH_3)_3SiO[Si(CH_3)_2-O]_{27.2}[-SiCH_3-O]_{3.2}Si(CH_3)_3$

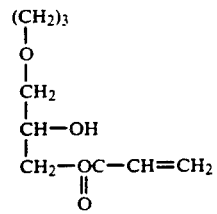

0.2 g of lauroyl peroxide.

The mixture is stirred until all of the components have dissolved.

80 g of water, 2 g of a 40.7% by weight aqueous solution of partially sulphated, ethoxylated nonylphenol containing 25 units of ethylene oxide, 3 g of a 20% by weight aqueous solution of sodium dodecylbenzenesulphonate and 60 mg of ethylenediaminetetraacetic acid (EDTA) are mixed in a beaker.

The acrylic monomers/diorganopolysiloxane mixture is introduced into this solution, with stirring. The mixture obtained is emulsified using an ULTRA-TURAX type homogenizer (marketed by PROLABO) for minutes at 20,000 revolutions/minute.

b) Polymerization

The following are introduced into a one litre flask:
400 g of water
1 g of 40.7% by weight aqueous solution of partially sulphated, ethoxylated nonylphenol containing 25 units of ethylene oxide
2 g of 20% by weight aqueous solution of sodium dodecylbenzenesulphonate
40 mg of EDTA
182.4 g of a 26.4% aqueous solution of GEROL PS 20 (water-dispersible sulphonated polyester marketed by RHONE-POULENC), which corresponds to 48 g of dry product.

Once the mixture has been brought to 75° C., with stirring, 0.8 g of ammonium persulphate dissolved in 10 ml of water is added and the preemulsion is then introduced in the course of 3 hours.

The mixture is kept at 75° C. for a further 1 hour after the end of the introduction and is then brought back to ambient temperature.

A latex containing 26% of dry extract relative to the total weight of the latex is obtained. 2) Preparation of a composite polyester film.

The latex obtained above is diluted by addition of distilled water to bring its dry extract concentration to 10% by weight. A layer of latex 4 μm thick is then deposited on a smooth bilaterally stretched polyester film 30 μm thick using a HAND-COATER apparatus fitted with a No. 0 draw bar. The film coat is then dried under tension at 120° C. for 30 sec. The thickness of the coat after drying is 0.5 μm.

The polyester film subjected to coating was obtained by extrusion, longitudinal drawing followed by transverse drawing and then thermofixing of a poly(ethylene glycol terephthalate) free from filler and having a viscosity index of 650. The roughness Ra of the support film thus obtained is less than 0.01 μm before coating. Its roughness SRa, measured as indicated above, is 0.016 μm.

3) Determination of the surface properties of the composite film

The film/metal static and dynamic coefficients of friction determined by the "SHOE-SHINE" method described above have the following values:

μs: 0.26
μd: 0.25

We claim:

1. Composite polyester films having improved slip, comprising an oriented polyester film in which at least one of the faces carries a coating comprising at least one modified polymer of a graft polyester comprising:
a) a backbone derived from a polyester which can be dissipated in water and contains a plurality of sulphonyloxy groups of the general formula:

$$(-SO_3-)_nM \qquad (I)$$

in which:
n is equal to 1 or 2
M represents a hydrogen atom, an alkali metal or alkaline earth metal, an ammonium cation or a quaternary ammonium cation;
b) grafts comprising copolymer units derived from at least one ethylenically unsaturated monomer and at least one ethylenically unsaturated organopolysiloxane soluble in the said ethylenically unsaturated monomer or monomers.

2. Composite polyester films according to claim 1, wherein said polyester, which can be dissipated, is a copolyester containing a plurality of units derived from at least two dicarboxylic acids, one of which contains at least one sulphonyloxy group in its molecule, and a plurality of units derived from at least one aliphatic diol.

3. Composite polyester films according to claim 2, wherein the number of units derived from a dicarboxylic acid containing a sulphonyloxy group is from 2 to 30 for a total of 100 units derived from dicarboxylic acids.

4. Composite polyester films according to claim 1, wherein said polyester which can be dissipated is a copolyester containing a plurality of units derived from at least one non-sulphonated dicarboxylic acid comprising terephthalic, isophthalic or phthalic acids.

5. Composite polyester films according to claim 1, wherein said polyester is a copolyester containing a plurality of units derived from terephthalic and isophthalic acids.

6. Composite polyester films according to claim 1, wherein said polyester contains a plurality of units derived from 5-sulphoisophthalic acid.

7. Composite polyester films according to claim 1, wherein said polyester contains a plurality of units derived from at least one aliphatic diol comprising ethylene glycol or its oligomers of formula HO—(CH$_2$—CH$_2$—O—)$_n$H, in which n is an integer from 2 to 10.

8. Composite polyester films according to claim 1, wherein said ethylenically unsaturated monomers making up part of the copolymer grafts are formed by acrylic monomers, vinyl and allyl esters of aliphatic or aromatic carboxylic acids, vinyl-aromatic compounds, ethylenic halides, ethylenic carboxylic acids or ethylenic sulphonic acids.

9. Composite polyester films according to claim 8, wherein said acrylic monomer corresponds to the general formula:

$$\begin{array}{c} R \\ | \\ CH_2=C-Y \end{array} \qquad (II)$$

in which:
R represents a hydrogen atom or a lower alkyl group, optionally substituted by a hydroxyl group;
Y represents a hydroxycarbonyl functional group; alkoxycarbonyl of formula —COOR$_1$, in which R$_1$ is a straight-chain or branched alkyl radical containing 1 to 20 carbon atoms, optionally substituted by a hydroxyl radical; nitrile, amide of formula —CON(R$_2$,R$_3$), in which R$_2$ and R$_3$, which may be identical or different, represent a hydrogen atom or a straight-chain or branched alkyl radical containing 1 to 20 carbon atoms.

10. Composite polyester films according to claim 9, wherein said acrylic monomer is formed by methyl acrylate and methyl methacrylate, ethyl acrylate and ethyl methacrylate, butyl acrylate, acrylic and methacrylic acids or acrylamide and methacrylamide.

11. Composite polyester films according to claim 10, wherein at least one crosslinking monomer is combined with said acrylic monomers.

12. Composite polyester films according to claim 11, wherein the amount of crosslinking monomer represents up to 5 mol % of the ethylenically unsaturated monomer or monomers.

13. Composite polyester films according to claim 11, wherein said crosslinking monomer is a polyethylenic monomer.

14. Composite polyester films according to claim 11, wherein said crosslinking monomer is a hydroxyalkyl(meth)acrylamide.

15. Composite polyester films according to claim 1, wherein said modified polymer comprises 0.1 to 15% by weight of at least one external crosslinking agent formed by the formophenolic resins and the amine-formal resins.

16. Composite polyester films according to claim 1, wherein said organopolysiloxanes from which the grafts are derived are represented by the formula:

$$R''R'RSiO\,(SiRR'''O)_m\,(SiRR''''O)_n\,SiR'R''$$

in which formula the symbols R are identical or different and represent a $C_1$-$C_4$-alkyl radical, phenyl or 3,3,3-trifluoropropyl, the symbols R' are identical or different and represent R or a vinyl radical, the symbols R" are identical or different and represent R or a radical OH, the symbols R'" are identical or different and represent R, a vinyl radical or a -r-X unit in which r represents a divalent organic radical and X represents an ethylenically unsaturated group, the symbols R"" are identical or different and represent R'" or a -r'-X' unit in which r' represents a divalent organic radical and X' represents a functional group which is not ethylenically unsaturated, at least 60% of the radicals represented by R, R' and R" are methyl radicals, and the symbols m and n can separately be zero, R' and/or R"" representing a vinyl radical if m is zero, and have a value sufficient to ensure a viscosity of the polymer of the order of 20 mPas to 10,000,000 mPas at 25° C.

17. Composite polyester films according to claim 1, wherein the respective amounts of backbone and grafts in the modified polymer are comprised of:

2 to 60% by weight relative to the modified polymer, of sulphonated polyester which can be dissipated in water 0.05 to 30% by weight relative to the modified polymer, of ethylenically unsaturated organopolysiloxane and, making up to 100%, units derived from ethylenically unsaturated monomer(s).

18. Composite polyester films according to claim 1, wherein the layer of modified polymer coating has a thickness of between 0.05 and 1 μm.

19. Composite polyester films according to claim 1, wherein the oriented polyester support film comprises a polymer containing at least 80 mol % of units derived from at least one aromatic dicarboxylic acid and ethylene glycol.

20. Composite polyester films according to claim 1, wherein said orientated polyester support film comprises a polymer containing at least 80 mol % of ethylene glycol terephthalate or ethylene glycol naphthalenedicarboxylate units.

21. Composite polyester films according to claim 1, wherein said orientated polyester support film has a thickness of between 5 and 30 μm.

22. Composite polyester films according to claim 1, wherein said orientated polyester support film has a roughness Ra of less than 0.05 μm.

23. Process for obtaining composite polyester films according to claim 1, comprising coating at least one face of said orientated polyester support film using an aqueous composition of modified polymer.

24. Process for obtaining composite films according to claim 23, wherein said aqueous composition of modified polymer is in the form of an aqueous dispersion.

25. Process for obtaining composite films according to claim 23, wherein said aqueous composition of modified polymer is in the form of an aqueous solution obtained by neutralizing, with the aid of an alkali metal base, free carboxylic acid groups present in said modified polymer in the aqueous dispersion.

26. Process for obtaining composite films according to claim 24, wherein said step of coating the orientated polyester support film is carried out before any drawing or between two drawings of the support film.

27. Magnetic recording material comprising a support film carrying on at least one of its faces a slip coating and a magnetic coating, wherein said support film comprises a composite polyester film according to claim 1.

28. A method of making a magnetic recording material comprising applying a magnetic recording coating to a support comprising the composite polyester films according to claim 1.

* * * * *